(12) United States Patent
Yutaka

(10) Patent No.: US 7,222,063 B2
(45) Date of Patent: May 22, 2007

(54) EMULATION APPARATUS AND PARTS, EMULATION METHOD, RECORDING MEDIUM AND PROGRAM

(75) Inventor: Teiji Yutaka, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 709 days.

(21) Appl. No.: 09/929,845

(22) Filed: Aug. 14, 2001

(65) Prior Publication Data

US 2002/0052728 A1    May 2, 2002

(30) Foreign Application Priority Data

Aug. 15, 2000 (JP) .......................... P2000-246509
Feb. 6, 2001 (JP) .......................... P2001-030228

(51) Int. Cl.
G06F 9/455 (2006.01)
A63F 9/24 (2006.01)

(52) U.S. Cl. .......................................... 703/24; 463/1
(58) Field of Classification Search ............... 703/24, 703/22, 23, 25; 717/138, 170; 712/40; 710/74; 463/1
See application file for complete search history.

(56) References Cited

U.S. PATENT DOCUMENTS

| | | | | |
|---|---|---|---|---|
| 5,404,557 A | * | 4/1995 | Yamashita | 712/23 |
| 5,577,232 A | | 11/1996 | Priem et al. | |
| 5,617,576 A | | 4/1997 | Solari et al. | |
| 5,782,642 A | * | 7/1998 | Goren | 434/307 R |
| 5,978,855 A | * | 11/1999 | Metz et al. | 709/249 |
| 5,982,399 A | * | 11/1999 | Scully et al. | 345/522 |
| 6,106,565 A | * | 8/2000 | Stapleton et al. | 703/23 |
| 6,132,315 A | | 10/2000 | Miyamoto et al. | |
| 6,346,048 B1 | * | 2/2002 | Ogawa et al. | 463/42 |
| 6,546,300 B1 | * | 4/2003 | Fukuda et al. | 700/100 |
| 6,646,653 B2 | * | 11/2003 | San et al. | 345/649 |
| 6,672,963 B1 | * | 1/2004 | Link | 463/43 |
| 6,799,157 B1 | * | 9/2004 | Kudo et al. | 703/28 |

FOREIGN PATENT DOCUMENTS

JP    1-155437 A1    6/1989

(Continued)

OTHER PUBLICATIONS

Kutaragi et al., "1999 IEEE International Solid-State Circuits Conference" Feb. 1999 p. 256-257.*

(Continued)

Primary Examiner—Anthony Knight
Assistant Examiner—Tom Stevens
(74) Attorney, Agent, or Firm—Lerner, David, Littenberg, Krumholz & Mentlik, LLP

(57) ABSTRACT

An emulator technology for correctly adapting a processing capability of an entertainment apparatus according to the contents requested by software. An emulator is incorporated in an entertainment apparatus without processing capability adjusting means, such as a personal computer operating system. The emulator judges through a determination section whether the software executed by the entertainment apparatus has requested a change of the processing capability of the apparatus, and if it is judged that the software has requested a change of the processing capability, the emulator makes it possible to change the processing capability of the entertainment apparatus within a range identified by predetermined change parameters supplied for the software in advance or afterward.

16 Claims, 8 Drawing Sheets

FOREIGN PATENT DOCUMENTS

| | | |
|---|---|---|
| JP | 06-075763 A1 | 3/1994 |
| JP | 06-083476 A1 | 3/1994 |
| JP | 11-207034 A1 | 8/1999 |
| WO | WO 98/29890 A1 | 7/1998 |

OTHER PUBLICATIONS

Tabo et al., "Importance of CAD Tools and Methodologies in Hight Speed CPU Design" IEEE 2000 p. 631-633.*

Suzuoki et al., "A Microprocessor with a 128-Bit CPU, Ten Floating-Point MAC's, Four Floating-Point Dividers, and MPEG-2 Decoder" IEEE p. 1608-1618.*

Anonymous, "PlayStation 2 Resources—Playstation 2 FAQ", Internet document, Aug. 7, 2000, pp. 1-4.

Traut, E., "Building the Virtual PC", Byte, vol. 22, No. 11, Nov. 1, 1997, pp. 51-52.

Beck, R. et al., "OS/2 Version 2.0-vol. 2: DOS and Windows Environment", OS/2 Version 2.0 DOS and Windows Environment, vol. 2, 1992, pp. 1-17, 128-153, 172-181, 197-225.

Boiston, A., "Backward Compatibility, Forward Thinking", GAMERWEB—Features, May 8, 2000, pp. 1-3.

* cited by examiner

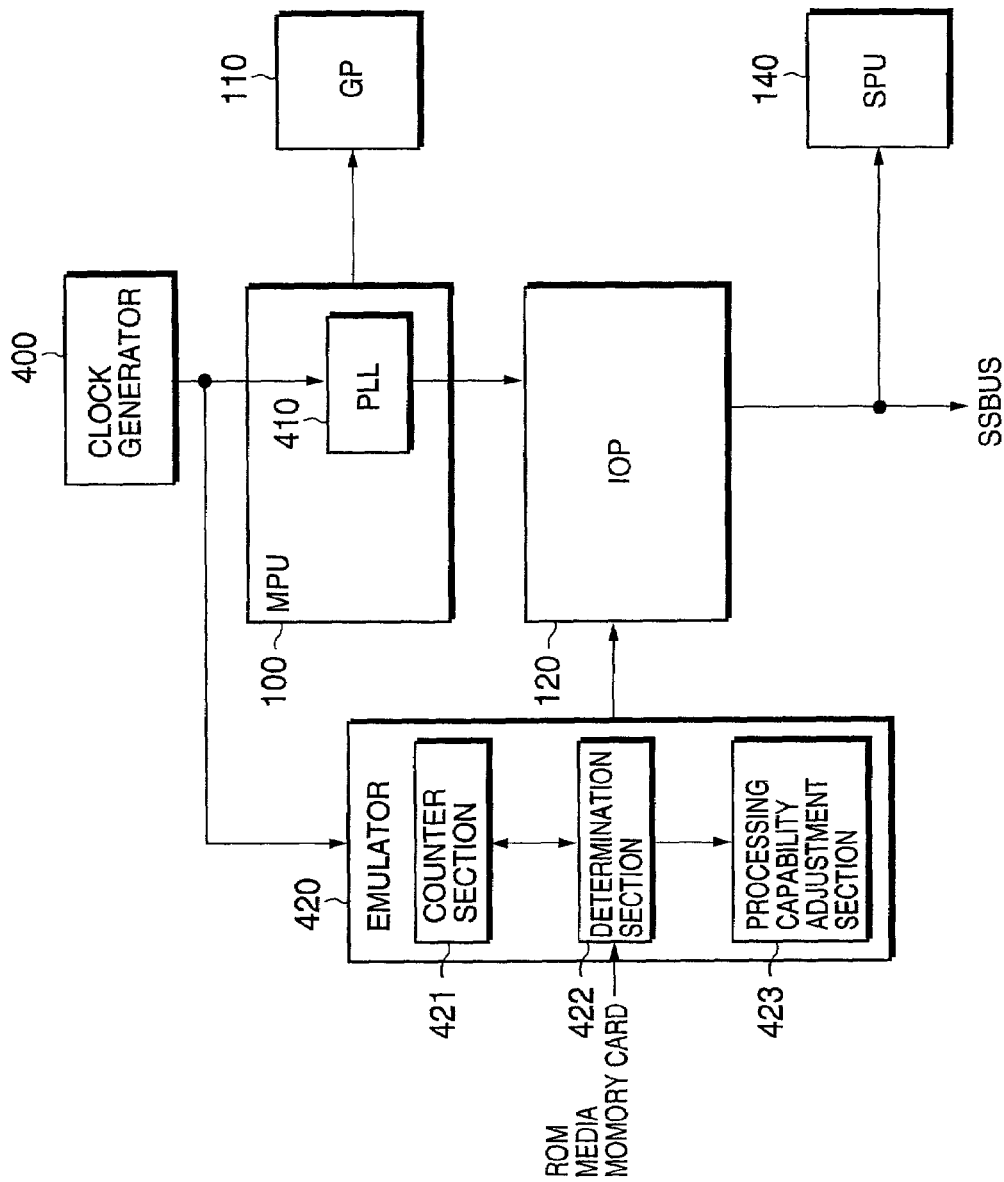

| ADJUSTMENT TARGET TITLE | POLYGON DRAWING SPEED | SPRITE DRAWING SPEED | ----- |
|---|---|---|---|
| AAA | 0 | 2 | ----- |
| BBB | 0 | 1 | ----- |
| ⋮ | ⋮ | ⋮ | ----- |

FIG.8

```
START
  ↓
EXTRACT DRAWING PACKET FROM FIFO — S701
  ↓
CONVERT DRAWING PACKET TO GP
DISPLAY LIST AND WRITE TO MEMORY — S702
  ↓
TRANSFER GP-CONVERTED DRAWING PACKET — S703
  ↓
END
```

FIG.9A

| Code | B | G | R |
|------|---|---|---|
| Y0 | | X0 | |
| Y1 | | X1 | |
| Y2 | | X2 | |

FIG.9B

| Code | | | | | |
|---|---|---|---|---|---|
| | | | B | G | R |
| | Z2 | | Y0 | | X0 |
| | Z2 | | Y1 | | X1 |
| | Z2 | | Y2 | | X2 |

EMULATION APPARATUS AND PARTS, EMULATION METHOD, RECORDING MEDIUM AND PROGRAM

CROSS-REFERENCE TO RELATED APPLICATIONS

This application is based upon and claims the benefit of priorities from the prior Japanese Patent Applications No. 2000-246509 filed on Aug. 15, 2000 and No. 2001-30228 filed on Feb. 6, 2001, the entire contents of both of which are incorporated herein by reference.

BACKGROUND OF THE INVENTION

The present invention relates to an emulation technology used in an information processing apparatus such as an entertainment apparatus, and more specifically, to an improved method for enabling application software developed for an information processing apparatus to be executed appropriately by another information processing apparatus with a different processing capability.

When an entertainment apparatus with a relatively high processing capability (hereinafter referred to as "host machine") executes application software (hereinafter referred to as "target AP") for an entertainment apparatus with a relatively low processing capability (hereinafter referred to as "subordinate machine") or when a specific entertainment apparatus executes a target AP for another entertainment apparatus, the host machine or the specific entertainment apparatus uses an emulation apparatus.

The basic function of the emulation apparatus is to form an execution environment of the entertainment apparatus in which the target AP is originally scheduled to be executed, and is implemented by software, hardware or a combination thereof.

Depending on a combination of commands included in a target AP, a conventional emulator apparatus may have such a problem that the operation timing at which the entertainment apparatus performs the relevant processing does not match the operation timing for the originally scheduled target AP. To prevent such a problem, parameters may be provided for adjusting the operation timing of the target AP so as to match the execution environment ("change parameters").

However, questions as to which target AP requires change parameters or to what extent corrections by the change parameters should be applied may be ascertained only after the entertainment apparatus is shipped. In such a case, it is possible to recollect the entertainment apparatus and change the synchronization timing of the emulation apparatus, but this involves troublesome operations.

Such a problem not only occurs in the entertainment apparatus but also occurs commonly in an emulation apparatus used in an information processing apparatus without any processing capability adjusting means such as an operating system.

SUMMARY OF THE INVENTION

Therefore, it is an object of the present invention to provide an emulation apparatus, emulation parts, emulation method and program capable of solving the problem described above and adapting correctly the processing capability of the information processing apparatus to the target AP.

The emulation apparatus provided by the present invention is incorporated in an information processing apparatus that is otherwise without any means of adjusting the processing capability. The emulation apparatus comprises: judging means for judging whether software that is being executed by the information processing apparatus has requested a change in a processing capability of the information processing apparatus; and adjusting means for changing the processing capability of the information processing apparatus when the software has requested the change in the processing capability. More specifically, the adjusting means changes a functional configuration of the information processing apparatus to a predetermined configuration and changes a processing parameter of the whole information processing apparatus or of a part of the information processing apparatus. The change in the processing parameter is carried out within a range identified by a predetermined change parameter for the software. The predetermined change parameter is recorded in a medium that was installed in advance of the software's installation or after installation of the software.

The "information processing apparatus that is ordinarily without a processing capability adjusting means" refers to a simple computer or system, such as a personal computer or workstation.

The information processing apparatus to which the present invention is applied is, for example, an entertainment apparatus provided with a plurality of processors having a master-slave relationship. The master-slave relationship of the processors in such an entertainment apparatus is configured so as to change according to the type of the software.

The judging means is configured so as to perform the judgment by identifying a medium that records the software.

When the judging means judges that the software requests the change of the processing capability, the adjusting means is configured so as to automatically convert binary information included in the software to binary information executable by the information processing apparatus.

The adjusting means is configured so as to read selectively one of a first change parameter recorded in an internal recording medium installed in advance, a second change parameter recorded in a non-rewritable recording medium loaded into the information processing apparatus afterward and a third change parameter recorded in a rewritable recording medium loaded into the information processing apparatus afterward and change the processing capability within a range identified by the read change parameter.

Each change parameter is determined for each of processing items implemented by the software, the processing items depending on functions of the information processing apparatus. The judging means is configured so as to judge whether a processing item for which a change parameter is determined exists in any one of the internal recording medium, the non-rewritable recording medium and the rewritable recording medium and further judge that the software requests the change of the processing capability when the processing item exists. In this case, the adjusting means is configured so as to adjust a speed per unit time of processing identified by the processing item to a speed determined by the change parameter.

The present invention also provides an emulation method for processing software read by the information processing apparatus. The method is executed in an information processing apparatus that is ordinarily without any means of adjusting the processing capability, as described above. The method comprises: judging whether the software that is being executed has requested a change in a processing capability of the information processing apparatus, and when it is judged that the software has requested the change in the processing capability, changing a processing parameter within a range identified by a predetermined change parameter for the software. The predetermined change parameter is recorded in a medium that was installed in advance of the software's installation or after installation of the software.

The present invention also provides a recording medium that is readable by an information processing apparatus. The information processing apparatus is ordinarily without any means of adjusting the processing capability. On the recording medium is recorded a program which instructs the information processing apparatus to judge whether software being executed by the information processing apparatus has requested a change in a processing capability of the information processing apparatus and, when the software has requested the change in the processing capability, to change the processing capability within a range identified by a predetermined change parameter for the software. The predetermined change parameter is recorded in a medium that was installed in advance of the software's installation or after installation of the software.

The present invention also provides a recording medium that is readable by an information processing and which is detachably installed in the information processing apparatus. The information processing apparatus includes means for enabling a processing capability of the information processing apparatus to be changed according to the software being executed. The recording medium comprises a first area which is read by the information processing apparatus before executing the software, but after the information processing apparatus is started up, and in which is recorded a code for allowing the information processing apparatus to recognize a type of software. The recording medium comprises a second area which is read by the information processing apparatus subsequent to reading the first area and in which is recorded a predetermined change parameter for identifying a changing part and a changing amount of the processing capability. The change parameter is provided in the second area for reading when the software requests a change in the processing capability.

The present invention also provides a program for instructing an information processing apparatus that is otherwise without any means of adjusting the processing capability. The information processing apparatus is instructed to judge whether the software being executed has requested a change in a processing capability of the information processing apparatus and, when the software has requested the change in the processing capability, to change a processing parameter within a range identified by a predetermined change parameter for the software. The predetermined change parameter is recorded in a medium that was installed in advance of the software's installation or after installation of the software.

BRIEF DESCRIPTION OF THE DRAWINGS

These objects and other objects and advantages of the present invention will become more apparent upon reading of the following detailed description and the accompanying drawings in which:

FIG. 5 illustrates a connection mode of a clock signal;

FIG. 8 is a flow chart showing a processing flow of format conversion by an emulator; and FIGS. 9A and 9B illustrate polygon drawing command formats, wherein FIG. 9A illustrates a GPU command format and FIG. 9B illustrates a GP command format.

DETAILED DESCRIPTION

Figure 1:
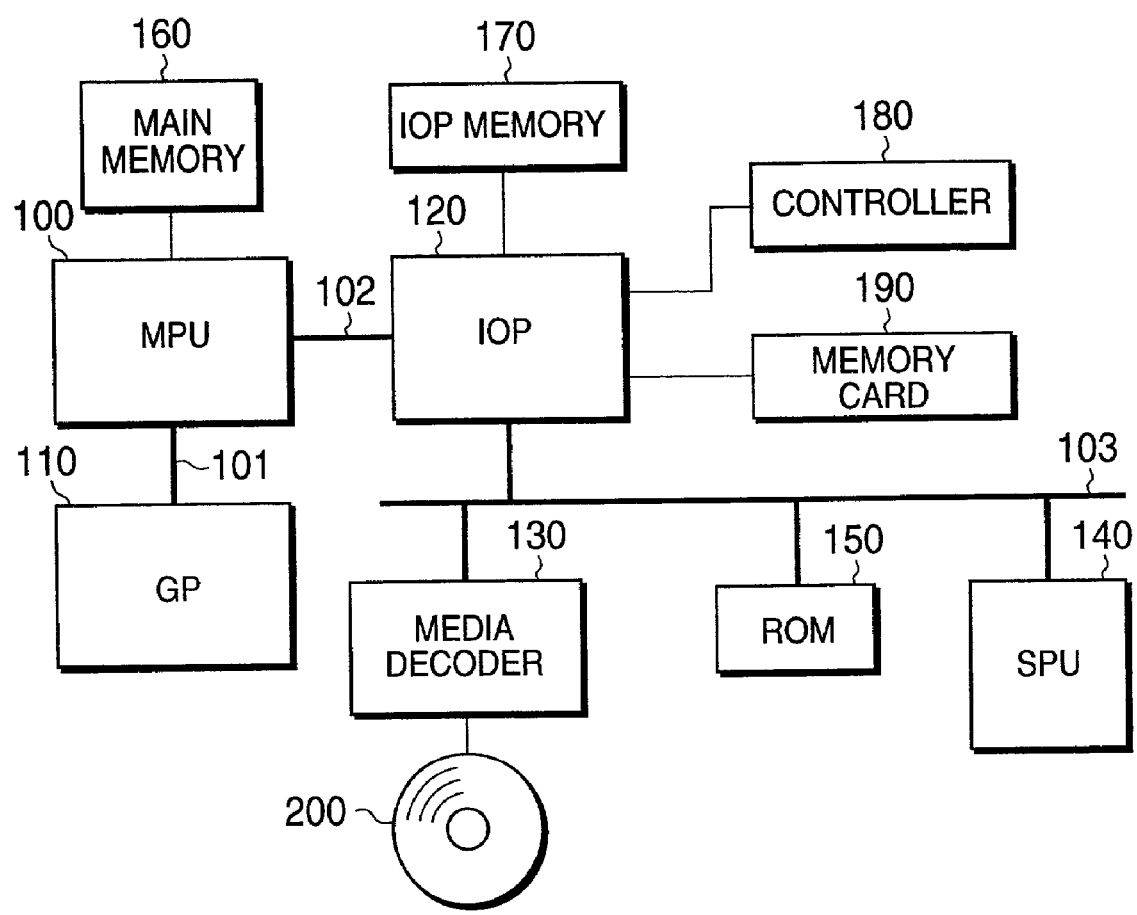
FIG. 1 is a block diagram showing a configuration of an entertainment apparatus of a host machine.

An embodiment of the present invention will be specifically described with reference to the accompanying drawings.

First Embodiment

A first embodiment describes a mode of an emulation apparatus incorporated in an entertainment apparatus, which is an example of an information processing apparatus without processing capability adjusting means. This embodiment will be explained assuming that a processing capability is a speed of drawing images and change parameters are intended to adjust a drawing speed of specific image processing. However, the drawing speed is one example of a processing capability of an entertainment apparatus.

<Host Machine>

FIG. 1 is a block diagram showing a main configuration of an entertainment apparatus in which the emulation apparatus of the present invention is incorporated.

In this entertainment apparatus, an MPU (micro processor unit) 100 and a GP (graphical processor) 110 are connected via a dedicated bus 101, the MPU 100 and an IOP (I/O processor) 120 are connected via a bus (SBUS) 102, and a media decoder 130 that reads software, etc. from a medium, an SPU (sound processor unit) 140, which is sound processing means and a ROM (read only memory) 150 are connected to the IOP 120 via a bus (SSBUS) 103. The MPU 100 is provided with a main memory 160 and the IOP 120 is provided with an IOP memory 170. The IOP 120 is further connected to a controller 180 and a memory card 190.

The basic function of the MPU 100 is to carry out predetermined processing by executing various programs stored in the ROM 150 and a target AP loaded from a medium 200 such as a CD and DVD to the main memory 160. The GP 110 is a graphic processor that assumes the drawing processing function of this entertainment apparatus. More specifically, the GP 110 performs drawing processing on the target AP according to instructions from the MPU 100.

The IOP 120 is an input/output sub-processor (a slave processor with respect to the MPU 100) that controls exchanges of data between the MPU 100 and peripheral apparatuses (media decoder 130 and SPU 140, etc.). The media decoder 130 reads data from the medium 200 and transfers the data to the main memory 160. The SPU 140 is a sound reproduction processor and reproduces compressed waveform data stored in a sound buffer (not shown) based on a pronunciation instruction from the MPU 100, etc. at a predetermined sampling frequency.

The ROM 150 is an example of emulation parts of the present invention and is a read-only memory that stores programs to be executed by the MPU 100 and the IOP 120 at the startup, etc. The ROM 150 stores programs shared by the MPU 100 and the IOP 120 and programs dedicated to the respective processors separately. One of the programs dedicated to the MPU 100 is an emulator program, which will be described later. The main memory 160 and the IOP memory 170 function as work memories for the MPU 100 and the IOP 120, respectively.

The controller 180 is an interface that transmits a player's intention to an application, etc. during the execution of a game, etc.

The memory card 190 is a rewritable, portable non-volatile secondary recording medium and stores results of processing executed by the MPU 100 and setting information, etc. The memory card 190 is also designed to store change parameters to make fine adjustments to the image processing speed of the emulator of the present invention, which will be described later.

This embodiment assumes that the medium 200 is non-rewritable, portable recording medium. This medium 200 stores a program and data, etc. that is necessary to execute the program. This data also includes a code to determine whether the medium 200 stores data for the host machine or data for the subordinate machine. The data for the subordinate machine includes change parameters to make fine adjustments to the drawing speed by the emulator <Subordinate Machine>

An overview of an entertainment apparatus, which is a subordinate machine for the entertainment apparatus in FIG. 1, will be explained below.

Figure 2:
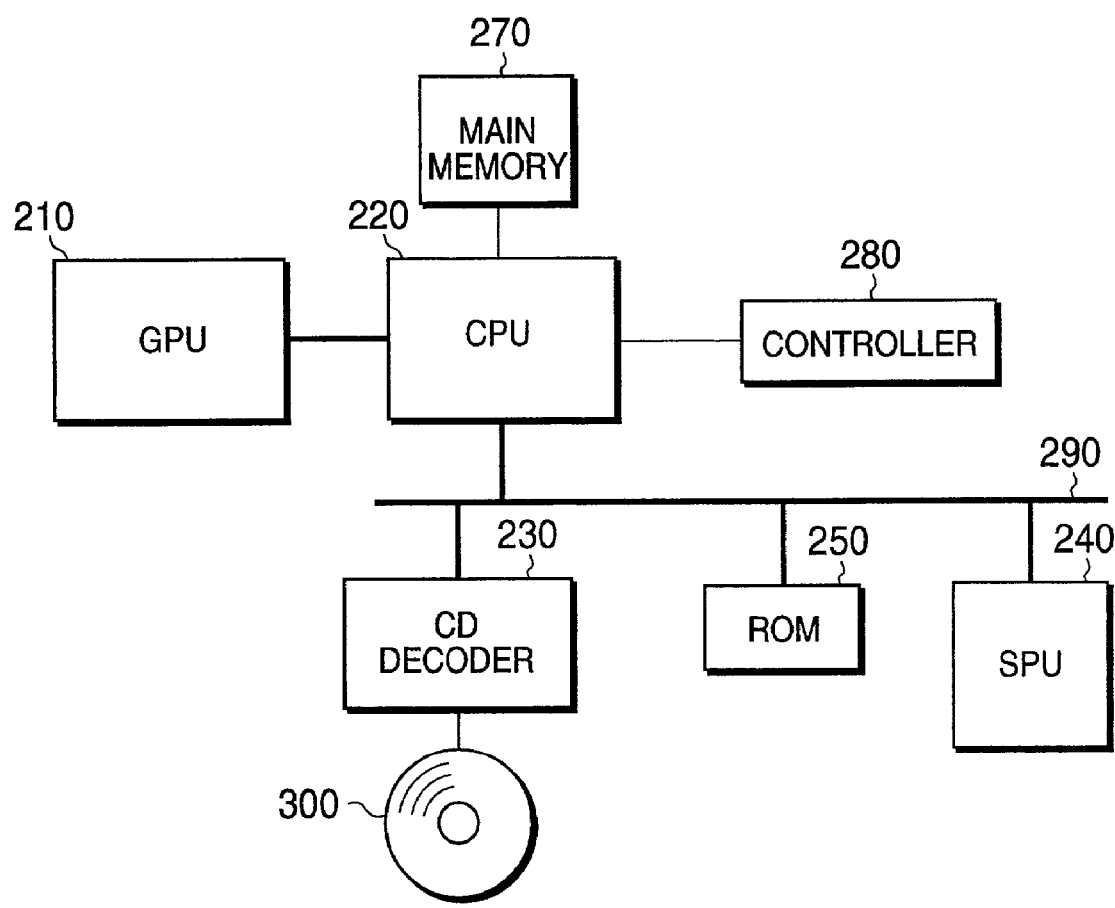
FIG. 2 is a block diagram showing a configuration of an entertainment apparatus of a subordinate machine.

In this entertainment apparatus, as shown in FIG. 2, a GPU (graphic processor unit) 210 and a controller 280 are connected to a CPU (central processor unit) 220 provided with a main memory 270, and furthermore a CD decoder 230, an SPU 240 and a ROM 250 are connected to the CPU 220 via a bus 290. The basic function of the CPU 220 is to carry out predetermined processing by executing a program stored in the ROM 250 and a program loaded from a CD 300 to main the memory 270. The operating frequency of the CPU 220 is lower than the operating frequency of the MPU 100, the host machine.

The GPU 210 is a graphic processor that performs drawing processing according to instructions from the CPU 220. The GPU 210 is provided with a CRTC function to display images and a polygon drawing function for a frame buffer (not shown). The CD decoder 230 reads recorded information from the CD 300 and transfers the information to the main memory 270. The ROM 250 stores a program to be executed by the CPU 220 at the startup, etc.

<Emulation Apparatus>

The emulation apparatus forms on the host machine a first function that allows the host machine to change its functional capability (functional configuration) to secure drawing or other processing compatibility with the subordinate machine and a second function that allows the host machine to change a capability (speed in this embodiment) of specific processing according to software. These functions may be formed by software, but an example of implementing these functions by combining the hardware provided for the host machine and separately provided software will be explained here.

As appreciated, the foregoing functional capability is one example of the processing capability of the host machine, and the foregoing capability of specific processing is another example of the processing capability of the host machine.

(First Function)

A first function is the function by which the MPU 100 or the IOP 120 loads and executes a predetermined program and selectively switches between two operating modes, that is, a "normal mode" and "emulation mode" and thereby changes the functional configuration of the entertainment apparatus to a predetermined configuration.

It is also possible to provide dedicated firmware to share this first function with another function. Through this first function, the host machine usually operates in a normal mode and enters into an emulation mode when the host machine executes a target AP for the subordinate machine. The method of determining whether an AP is a target AP for the subordinate machine or not will be described later.

In the emulation mode according to this embodiment, the IOP 120 of the host machine functions as the CPU 220 of the subordinate machine and the MPU 100 and GP 110 function as the GPU 210 of the subordinate machine. This is implemented by providing, for example, the same processor core as the CPU 220 for the IOP 120. The IOP 120 can execute the target AP provided for execution by the CPU 220 of the subordinate machine as is and performs a processing operation similar to that in the case of the subordinate machine.

The processor core of the IOP 120 may execute the target AP provided for the CPU 220 of the subordinate machine as is and perform a similar operation (for example, binary compatible processor core), but this embodiment uses the same processor core to improve the compatibility with the entertainment apparatus of the subordinate machine.

The clock frequency of the IOP 120 is 37.5 MHz in the normal mode and may be changed to a frequency according to the operating frequency of the CPU 220 of the subordinate machine in the emulation mode, for example, 33 MHz or may be changed to the clock frequency most suitable to execute the target AP. This assures the operation even when the target AP optimizes the operation for the hardware of the subordinate machine at a level of one clock.

The MPU 100 and IOP 120 change their interfaces according to the operating mode. In the emulation mode, the IOP 120 provides the MPU 100 with the same interface as that for the CPU 220 and the MPU 100 also provides the IOP 120 with the same interface as that for the GPU 210.

The SPU 140 also changes its operation between the emulation mode and normal mode. That is, in the emulation mode, the SPU 140 operates in the completely same way as for the SPU 240 of the subordinate machine. On the other hand, in the normal mode, the SPU 140 operates as means for performing sound processing with higher performance than the SPU 240. The clock frequency of the SPU 140 is 44.1 KHz according to the sampling frequency of a CD-ROM in the emulation mode and 48 KHz according to the sampling frequency of a DVD in the normal mode.

Then, the content of the first function will be explained more specifically.

(Determining Operating Mode)

Upon powering-on, etc. of the host machine, the emulation apparatus determines through the media decoder 130 whether the medium 200 in the drive is for the host machine or for the subordinate machine. This determination is possible by recording a type code indicating whether the medium is for the host machine or for the subordinate machine in the first area of the medium 200, which is loaded to the entertainment apparatus first, reading this type code and referencing a medium type register (not shown) in the media decoder 130. If the determination result shows that the medium 200 is a medium for the host machine, the emulation apparatus starts the host machine in the normal mode. When there is nothing in the drive, the operation is the same. On the other hand, if the medium 200 in the drive is a medium for the subordinate machine, the emulation apparatus starts the host machine in the emulation mode.

(Changing Operating Mode)

The emulation apparatus generates two types of reset signal and switches between the normal mode and emulation mode above based on these reset signals.

Figure 3:
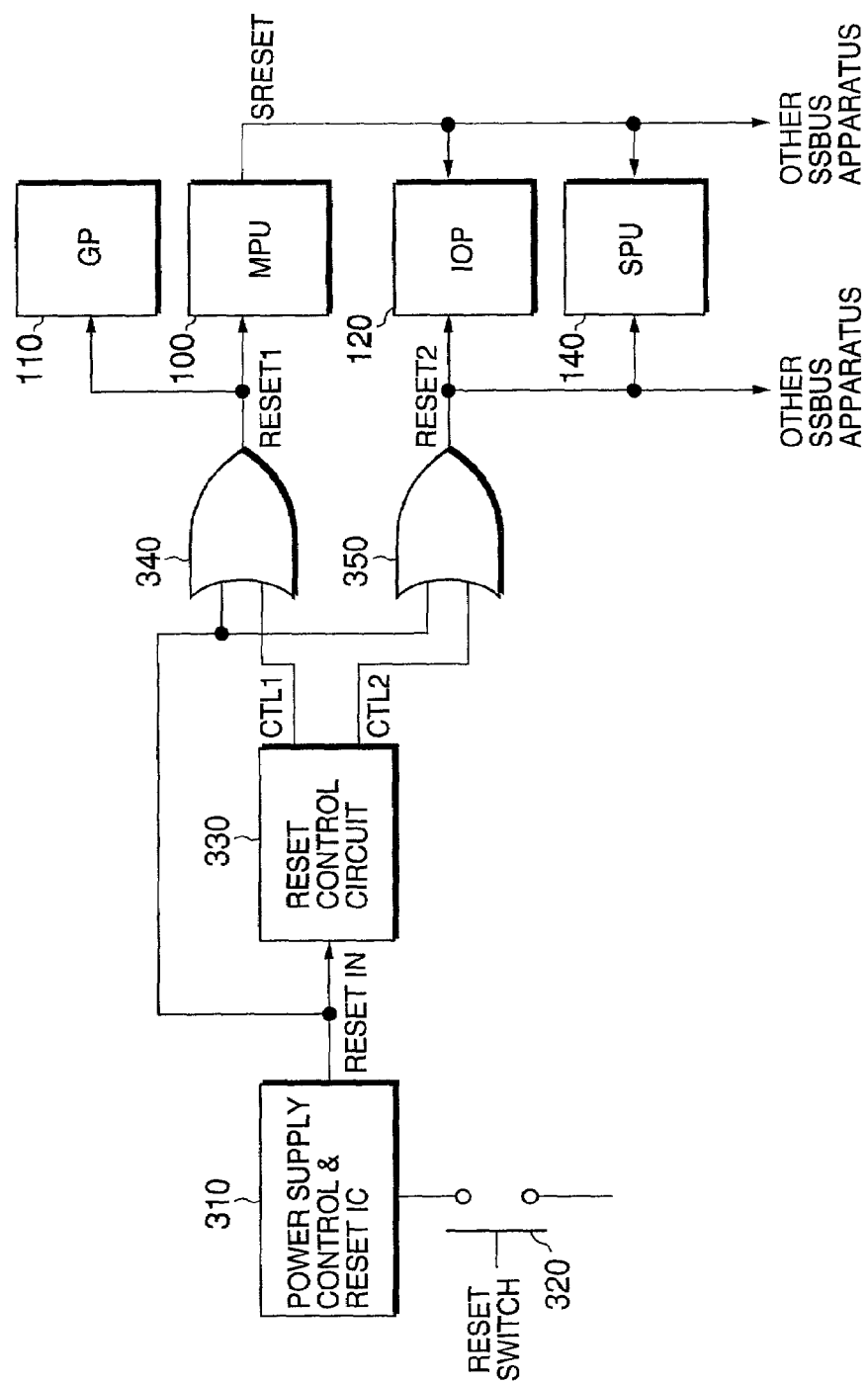
FIG. 3 illustrates a connection mode of a reset signal.

FIG. 3 shows an example of a reset signal generation mechanism.

As shown in FIG. 3, the emulation apparatus uses a signal output from a power supply control/reset IC 310 as a RESET•IN signal. This RESET•IN signal is input to a reset control circuit 330 and OR circuits 340 and 350. The reset control circuit 330 outputs two kinds of signal (CTL1, CTL2). These signals become other input signals for the OR circuits 340 and 350. It is RESET 1 signal that is output from the OR circuit 340 and it is RESET 2 signal that is output from the OR circuit 350. The RESET 1 is input to the MPU 100 and GP 110 of the host machine. The MPU 100 outputs an SRESET signal.

On the other hand, the RESET 2 signal is input to various apparatuses on the SSBUS 103 such as the IOP 120 and SPU 140. The SRESET signal from the MPU 100 is also input to the IOP 120 and SPU 140, etc.

In the above configuration, upon powering-on of the host machine or detection of pressing of a reset switch 320 provided for the host machine, the power supply control/reset IC 310 asserts the RESET•IN signal. The power supply control/reset IC 310 negates the RESET•IN signal when a predetermined time has passed after all power supplies are turned on.

When the RESET•IN signal is asserted, the reset control circuit 330 asserts the signals (CTL1, CTL2) for the OR circuits 340 and 350. Then, after a predetermined time has passed, the reset control circuit 330 negates the RESET signal (RESET 2) supplied to the IOP 120 and SPU 140 first. This negates the signal (CTL2) for the OR circuit 350. Then, the reset control circuit 330 negates the RESET signal (RESET 1) supplied to the MPU 100 and GP 110. This negates the signal (CTL 1) for the OR circuit 340.

A difference in the timing of releasing the RESET signal between the MPU 100, etc. and IOP 120, etc. is provided so that the MPU 100 and GP 110 start to operate after the IOP 120 starts a quasi-reliable operation.

The MPU 100, IOP 120 and SPU 140, etc. reset by the RESET signals (RESET 1 signal and RESET 2 signal) start to operate in the normal mode. Then, in case of entering the emulation mode after necessary initialization processing is completed, the MPU 100 asserts the SRESET signal. The IOP 120 and SPU 140, etc. reset by this SRESET signal each start to operate in the emulation mode.

(Interface Changeover)

Figure 4:
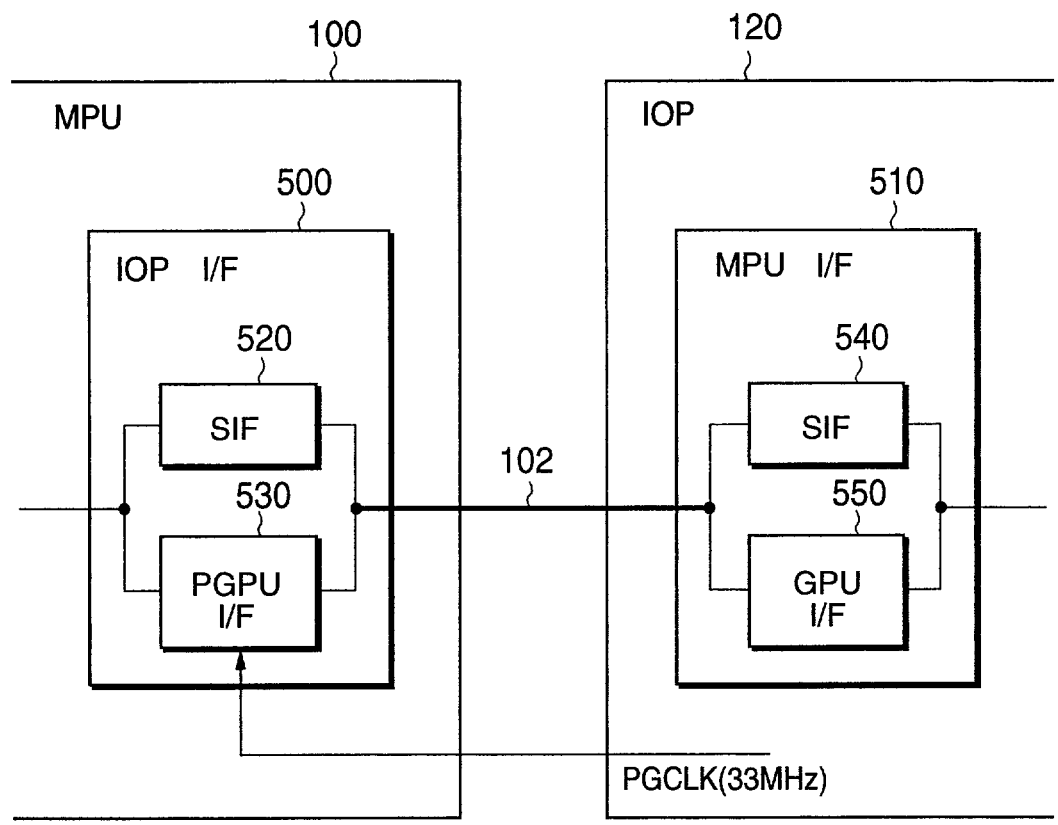
FIG. 4 illustrates a configuration of an interface between an MPU 100 and IOP 120.

In the aforementioned changeover between operating modes, the interface between the MPU 100 and IOP 120 is also changed. An overview of this interface changeover will be explained with reference to FIG. 4.

As a premise, an IOP interface section (IOP I/F) 500 is provided inside or around the MPU 100 and an MPU interface section (MPU I/F) 510 is provided inside or around the IOP 120. Two systems of internal interface section (SIF section 520, PGPU I/F 530) are connected in parallel inside the IOP interface section 500. Also two systems of internal interface section (SIF section 540, GPU I/F 550) are connected in parallel inside the MPU interface section 510.

The SIF section 520 provides the MPU 100 with an SBUS interface of the bus 102 in the normal mode. The PGPU interface section 530 provides the MPU 100 with the quasi-same interface as that of the GPU 210 of the subordinate machine in the emulation mode. The SIF section 520 and PGPU interface section 530 are each provided with an FIFO buffer for storing transfer data and a register group used for transfer control, etc.

The SIF section 540 provides the IOP 120 with an SBUS interface of the bus 102 in the normal mode. The GPU interface section 550 provides the IOP 120 with the same GPU interface as that of the CPU 220 of the subordinate machine in the emulation mode.

The IOP interface section 500 operates in synchronization with the bus clock (150 MHz) of the internal bus of the MPU 100. On the other hand, the MPU interface section 510 operates in synchronization with the operating frequency of the IOP 120. That is, the MPU interface section 510 operates in synchronization with a 37.5 ($=150/4$) MHz clock in the normal mode and operates in synchronization with a clock frequency ½ the clock supplied from an emulator 420, which will be described later, in the emulation mode.

For this reason, a communication between the MPU 100 and IOP 120 in the normal mode becomes a synchronous communication and a communication between the MPU 100 and IOP 120 in the emulation mode becomes an asynchronous communication. The PGPU interface section 530 includes a logic to absorb the asynchronous communication in the emulation mode and a clock (PGCLK: 33 MHz) supplied from the IOP 120 is input.

In such a configuration, the MPU 100 uses the SIF section 520 as the interface for the IOP 120 in the normal mode and the IOP 120 uses the SIF section 540 as the interface for the MPU 100. In the emulation mode, the MPU 100 uses the PGPU interface section 530 and the IOP 120 uses the GPU interface section 550.

Changeover between the SIF section 520 and PGPU interface section 530 in the MPU 100 is carried out by software. That is, after a reset, the SIF section 520 is selected and when the software executed by the processor core of the MPU 100 carries out a write to a specific control register in the MPU 100, a changeover is made to the PGPU interface section 530.

Changeover between the SIF section 540 and GPU interface section 550 in the IOP 120 is carried out by hardware after a reset. That is, when the IOP 120 is reset by the RESET signal (RESET 2), the SIF section 540 is selected and when the IOP 120 is reset by the SRESET signal, the GPU interface section 550 is selected.

(Processing Capability Adjustment)

As described above, when the emulation mode is entered, the image processing speed is changed. The mechanism of changing this image processing speed will be explained with reference to FIG. 5 and FIGS. 6A and 6B.

Here, suppose the MPU 100 is provided with the function of a PLL circuit 410 that converts an input clock to any one of a plurality of provided frequencies and outputs to IOP 120.

The MPU 100 converts the frequency of a clock generator 400 of the host machine using the PLL 410, generates a reference clock of each processor core inside, a bus clock of the internal bus, a reference clock of data transfer to the GP 110, an operating reference clock in the normal mode and an operating reference clock in the emulation mode, and supplies these clocks selectively to the IOP 120.

In the emulation mode, the IOP 120 carries out image processing as the CPU 220 of the subordinate machine using a clock of a predetermined frequency supplied from the MPU 100. For specific image processing, the image processing speed is fine-adjusted by the emulator 420, which will be described later.

(Second Function)

Then, a specific example (fine-adjustment function) of a second function of the host machine will be explained. This function is implemented by the emulator 420 shown in FIG. 5.

The emulator 420 comprises the following functional blocks, which are implemented by the MPU 100 or a separately provided CPU loading an emulator program, that is, a counter section 421, a determination section 422 and a processing capability adjustment section 423. The emulator program is recorded, for example, in the ROM 150.

The counter section 421 counts a clock generated by the clock generator 400 at certain intervals. The determination section 422 determines whether a target AP requests a change of a capability of the whole or part of specific processing to be executed by the host machine or not and the processing capability adjustment section 423 changes the capability of the specific processing within a range identified by change parameters which are selectively loaded from any one of the ROM 150, medium 200 and memory card 190.

Figures 6A, 6B:
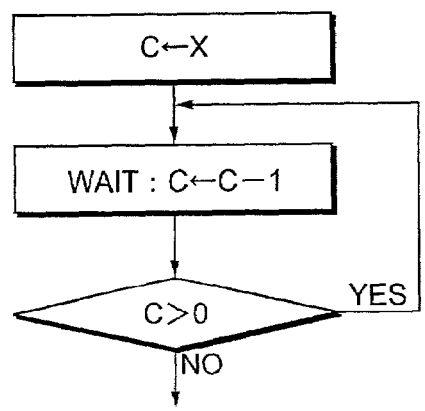
FIG. 6A is a table showing content examples of change parameters.
FIG. 6B is a flow chart showing a procedure for delaying output timing of a drawing result.

This embodiment has change parameters as shown in FIG. 6A.

That is, these are quantities of adjustment of a specific image processing speed determined for each title (target AP) to be adjusted, for example, polygon drawing speed, sprite drawing speed, etc. In the figure, "0" means that no adjustment is required. "1" and "2" are quantities of adjustment. The processing capability adjustment section 423 carries out fine adjustments on the speed of the relevant processing based on these quantities of adjustment. Fine adjustment is implemented by delaying the output timing of the result of drawing, which should originally be carried out at a speed based on the clock generator 400 by a clock determined by the quantity of adjustment. As shown in FIG. 6B, this delay processing consists of setting a quantity of adjustment X in a count value C in the process of output processing of the drawing result, decrementing the count value C by 1 for every count by the counter section 421 and outputting the drawing result when the count value C reaches 0.

If a memory card 190 is provided, the memory card 190 is given the highest priority in the order of reading change parameters. In the case where the memory card 190 does not support change parameters of the target AP or the memory card 190 is not inserted, a read from the medium 200 is attempted. In the case where the medium 200 does not support change parameters of the target AP, a read from the ROM 150 is attempted. The reason that the reading order is determined in this way is as follows.

The memory card 190 is a rewritable recording medium, and therefore if a change parameter is old information, this must have been overwritten with other information and the fact that a change parameter is recorded allows an assumption that the change parameter is the latest one supplied subsequently. Thus, this memory card 190 is searched first of all.

The medium 200 is assumed to be portable, capable of being distributed with change parameters changed subsequently and at an affordable price, normally record the target AP as main information, normally record a change parameter if so required by the target AP and be most general as a mode of supplying change parameters subsequently. If the medium 200 is a rewritable medium, it is given priority over those non-rewritable media as in the case of the memory card 190.

The ROM 150 is a non-rewritable medium and if some change parameter is recorded, it is assumed to have been recorded at the time of shipment.

Thus, reading change parameters in the above-described order will increase the possibility of reading the latest change parameters.

In this way, by providing the emulator 420 and making it possible to selectively read change parameters from any one of the ROM 150, medium 200 or memory card 190 and arbitrarily adjust the capability of specific processing, it is possible to make changes without the need for a troublesome procedure even if the name of a target AP which requires a change of the processing capability and the extent of the change (adjustment range) are ascertained after the entertainment apparatus is shipped.

The above-described case is an example of using one change parameter for one target AP, but the system can also be configured in such a way that different change parameters for the same target AP are recorded in the ROM 150, medium 200 and memory card 190 and a selection is made arbitrarily from these. This will increase the number of types of processing that can be changed and broaden the scope of changes.

<Operation Mode>

Then, the operation of the host machine incorporating the emulation apparatus will be explained.

Figure 7:
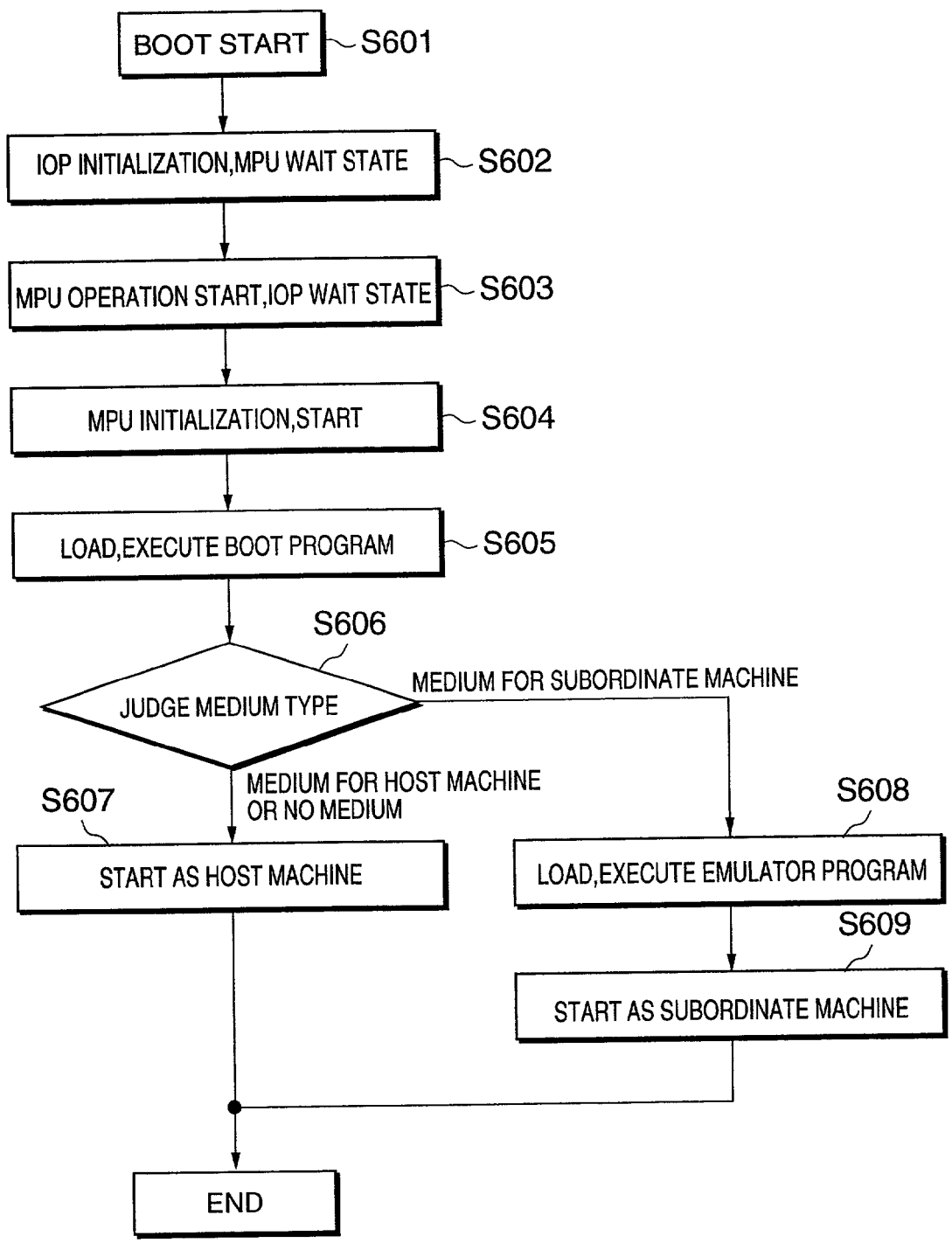
FIG. 7 is a flow chart showing a processing flow of a boot sequence by a host machine.

FIG. 7 illustrates the processing flow of a boot sequence.

Powering-on or pressing of the reset switch generates a RESET signal (RESET 1 or RESET 2). The MPU 100 and IOP 120 start to execute the program from the same boot vector address first (S601). As described above, this embodiment uses processors with the same architecture for the MPU 100 and IOP 120, and therefore the MPU 100 and IOP 120 also have the same boot vector address. At this time, while the IOP 120 directly accesses the ROM 150, the MPU 100 accesses the ROM 150 via the IOP 120.

To carry out the own initialization processing first, the IOP 120 does not give bus mastership to the MPU 100, leaving the MPU 100 in a standby state (S602).

The area of the ROM 150, which is accessed by the MPU 100 or IOP 120 after a reset stores a code for acquiring a processor ID, determining whether the corresponding processor is the MPU 100 or IOP 120 and jumping to the code for each processor according to the result. The IOP 120 and MPU 100 jump to their respective codes by executing the corresponding codes.

After jumping to its own code, the IOP 120 determines whether the reset this time is a reset by the RESET signal or a reset by the SRESET signal. The IOP 120 can determine whether the reset is by the RESET signal or by the SRESET signal by referencing bits of a specific control register.

The reset in this case is a reset by the RESET signal, and therefore the IOP 120 initializes the hardware for the entertainment apparatus of the host machine so as to start as the entertainment apparatus of the host machine. Then, the IOP 120 sets up the drivers of the peripheral apparatuses (controller, media drive, etc.)

When the necessary initialization processing is completed, the IOP 120 allows the MPU 100, which has been on standby, to start to operate (this state is designated as "MPU On") and waits for a request from the MPU 100 (S603). The MPU On is realized when the IOP 120 rewrites bits of a specific control register.

When access to the ROM 150 is accepted by the IOP 120 that has completed the initialization processing (when MPU On is set), the MPU 100 carries out a read from the ROM 150 and starts to execute the program read (S604, S605). Through this program, the MPU 100 acquires the own processor ID as in the case of the IOP 120 and jumps to the own code (for the MPU 100) and displays an opening screen common to the subordinate machine and the own machine.

Then, the MPU 100 determines the type of the medium 200 inserted in the drive (S606). When reset by a RESET signal (RESET 2), the media decoder 130 identifies the medium 200 inserted in the drive, reflects the result (medium for the host machine/medium for the subordinate machine/ no medium, etc.) in a medium type register in the media decoder 130 and waits for a command.

If the result of the determination of the medium type shows that the medium 200 for the host machine is inserted or there is no medium, the machine is started as the host machine as is and displays a logo, etc. for the host machine (S607). Then, the MPU 100 loads a target AP for the host machine from the medium 200 to the main memory 160 and starts to execute the target AP. If drawing processing is carried out during execution of the target AP, the MPU 100 instructs the GP 110 to perform drawing and if sound is output, the MPU 100 instructs the SPU 140 via the IOP 120 to output sound.

If the result of the determination of the medium type shows that the medium 200 for the subordinate machine is inserted in the drive, the MPU 100 changes the mode to the emulation mode and starts the machine as the subordinate machine (S608, S609). At this time, the MPU 100 loads the emulator program from the ROM 150 to the main memory 160 and executes it to form the emulator 420.

The emulator 420 accesses the memory card 190 to check whether there is any change parameter for the target AP. If there is no change parameter in the memory card 190 or the memory card 190 is not inserted, the emulator 420 accesses the medium 200 to check whether there is any change parameter for the target AP. In the case where no change parameter is recorded in the medium 200, the emulator 420 accesses the ROM 150. If any change parameter is found, the emulator 420 reads the change parameter and makes fine adjustment to the processing speed as described above. If no change parameter is found at any place, the emulator 420 judges that there is no need to carry out fine-adjustment and moves on to the next step.

Then, the emulator 420 changes the interface and clock. As a result, the IOP 120 starts an operation similar to that of the CPU 220 of the subordinate machine, displays a logo, etc. for the subordinate machine and boots a compatible kernel. Thereafter, the IOP 120 executes the target AP for the subordinate machine. To draw graphics during the execution of the target AP, the IOP 120 sends a GPU command to the MPU 100 to instruct to perform drawing, and to output sound, the IOP 120 instructs the SPU 140 in the emulation mode to output sound.

In the emulation mode, the MPU 100 functions as the GPU 210 of the subordinate machine. Therefore, it is necessary to convert the format of drawing processing data or command.

That is, the MPU 100 converts GPU data, etc. sent from the IOP 120 to GP data, etc. so that the GPU data can be executed by the GP 110.

FIG. 8 shows the processing procedure by the MPU 100.

When a drawing packet in the GPU format is written in an FIFO of the PGPU interface section 530, an interrupt to the MPU 100 is generated. Upon receiving this interrupt, the MPU 100 takes out the GPU format drawing packet from the FIFO of the PGPU interface section 530 (S701). Then, the MPU 100 converts this GPU format drawing packet to a GP format drawing packet and writes this packet into the main memory 160 (S702). Then, the MPU 100 transfers the converted GP format drawing packet to the GP 110 (S703).

A specific example of format conversion of a drawing command will be explained.

Here, an example of format conversion of a triangular polygon drawing command will be explained. Suppose the GP 110 adopts a Z-buffer system, whereas the GPU 210 does not adopt a Z-buffer system.

FIG. 9A shows a GPU command format in this case and FIG. 9B shows a GP command format. The GPU command consists of one word, 32 bits and the GP command consists of one word, 64 bits. In FIG. 9A and FIG. 9B, "Code" is a code to identify the drawing type and "B", "G" and "R" are color information. "X" and "Y" are coordinate information and "Z" is depth information. Since the GP 110 adopts a Z-buffer system, the GP 110 can control priority order irrespective of the drawing order. On the other hand, the GPU 210 does not adopt a Z-buffer system, and therefore the GPU command does not include depth information. For this reason, when converted to the GP format, a same predetermined value is entered in "Z".

Upon receiving the GPU packet from the IOP 120 as shown in FIG. 9A, the MPU 100 determines the command type by interpreting the first one word and interprets the content of the following data. Then, the MPU 100 rearranges this interpreted data, converts the accuracy of RGB, X and Y, creates the GP command packet shown in FIG. 9B and transfers the GP command packet to the GP 110.

As described above, the emulation apparatus of this embodiment determines whether the target AP requests a change of the processing capability of the host machine and if the part to be changed requires a change of the functional capability of the host machine, the emulation apparatus changes the functional configuration of the host machine, and if the part to be changed requires a change of the capability (speed in this embodiment) of specific processing to be executed, the emulation apparatus changes the capability of the specific processing within the range identified by the change parameters, and can thereby reliably absorb subtle differences in processing elements of the target AP for the subordinate machine in advance or afterward and adequately execute the target AP.

Especially, the emulator 420 can arbitrarily adjust the processing speed for specific processing subsequently and record the change parameters for that purpose in the memory card 190, medium 200 or ROM 150 and distribute them, and can thereby easily achieve an optimal processing speed for the target AP.

By the way, this embodiment shows the case where the emulation apparatus is implemented by a combination of hardware and software. If all of this is implemented by software, a program to implement at least the functions of changing the interface, adjusting the processing speed and converting formats should be recorded in a predetermined memory area at the time of shipment of the entertainment apparatus and the MPU 100, etc. should load and execute this program.

It is also possible to record the program in a distributable ROM or other recording medium subsequently and allow the MPU 100, etc. to load and execute this program at the time of operation.

With respect to the emulator program to form the emulator 420, it is also possible for the entertainment apparatus to record the emulator program in a replaceable recording medium subsequently.

This embodiment describes the case where the present invention is applied to an entertainment apparatus, but it goes without saying that the present invention is likewise applicable to other information processing apparatuses without any image processing speed adjusting means such as an operating system.

By the way, if the present invention is implemented by allowing an information processing apparatus that incorporates an operating system to load and execute a program, this can be done by incorporating in the program the function of suppressing the image processing speed adjusting means.

Second Embodiment

Then, a second embodiment of the present invention will be explained.

Here, an example of a case will be shown where the emulation apparatus of the present invention is implemented by software that can be acquired subsequently.

What is important in implementing an emulation apparatus is to allow a target AP executing side to interpret binary information (the polygon drawing command above, etc.) included in the target AP for another information processing apparatus and carry out corresponding processing.

Normally, since real-time processing of a three-dimensional image requires high-volume and multi-phase operation processing, hardware implements part of the function, especially the image processing engine. However, some target APs can also use part of the function of the image processing engine on the AP executing side. Furthermore, when it is obvious that the target AP is for a specific apparatus, once the apparatus on the AP executing side constructs an image processing environment for the apparatus beforehand, the apparatus can execute the target AP or an AP of the same kind thereafter.

This embodiment forms a media identification function and image processing environment formation function by allowing an information processing apparatus equipped with a CPU and image processing engine to load and execute a program to implement the image processing environment of a target AP for another apparatus (including use combined with the image processing engine).

The media identification function identifies the apparatus for which the target AP is used and determines whether the target AP requires a change of the processing capability of the image processing engine or not based on the identification result.

The image processing environment formation function implements an image processing environment for the target AP when the media identification function determines that the processing capability of the image processing engine needs to be changed.

As described above, the medium that records the target AP records the type code to identify the apparatus for which the target AP is used or title information to identify the content of the target AP.

Thus, in this embodiment, the CPU of the information processing apparatus reads the type code or title information after the target AP is inserted in the drive and the system is booted, and determines whether a change of the processing capability of the current image processing engine is required or not using the media identification function. When it is judged that a change is required, this embodiment is configured so that the image processing environment formation function changes the processing capability by automatically converting the binary information included in the target AP to the binary information of the information processing apparatus on the executing side.

The emulation apparatus of the second embodiment identifies the apparatus for which a target AP is used and changes the processing capability of the information processing apparatus on the executing side to an optimal value and can thereby execute the AP for the other apparatus appropriately. Furthermore, when fine-adjustment of the processing capability is required, the fine-adjustment is performed using the same procedure as that in the first embodiment. Moreover, it may also be arranged that changing of a functional configuration of the information processing apparatus on the executing side is performed as in the first embodiment prior to or subsequently to the foregoing automatic conversion of the binary information.

On the contrary, if the target AP is for the other apparatus, the information processing apparatus can also stop the change of the processing capability by the emulation apparatus and prevent the emulation apparatus from operating.

As is apparent from the above explanations, the present invention can produce such an excellent effect that the processing capability of the information processing apparatus can be adapted to the target AP correctly.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

The invention claimed is:

1. An emulation apparatus, operable within a first information processing apparatus, for enabling the first information processing apparatus to better execute a software program that was originally intended for execution by a second information processing apparatus, the first information processing apparatus having a processing capability that is different than a processing capability of the second information processing apparatus, said emulation apparatus comprising:

determining means for determining, when the software program is being executed by the first information processing apparatus, whether the software program has requested a change of the processing capability of the first information processing apparatus; and adjusting means for changing, when said determining means determines that the software program has requested the change of the processing capability, a value of a particular processing parameter in the first information processing apparatus to a value more compatible with execution of the software program based on a stored change parameter associated with the software program, the change in the value of the particular processing parameter thereby adjusting the processing capability of the first information processing apparatus to emulate the processing capability of the second information processing apparatus.

2. The emulation apparatus according to claim 1, wherein said emulation apparatus is operable within an entertainment apparatus that includes a pair of processors operating in a master-slave relationship determined by the software program.

3. The emulation apparatus according to claim 1, wherein said determining means determines whether the software program has requested a change of the processing capability of the information processing apparatus by identifying whether a medium that stores the software program was originally intended for a host machine or for a subordinate machine.

4. The emulation apparatus according to claim 1, wherein the software program includes second information processing apparatus binary information intended for execution by the second information processing apparatus, and when said determining means determines that the software program has requested the change of the processing capability, said adjusting means changes the value of the processing parameter by converting the second information processing apparatus binary information into further binary information that is executable by the first information processing apparatus.

5. The emulation apparatus according to claim 1, wherein said adjusting means reads the change parameter recorded in a device selected from the group consisting of: an internal recording medium, a non-rewritable recording medium loaded into the information processing apparatus, and a rewritable recording medium loaded into the information processing apparatus, and said adjusting means changes the processing capability based on the read change parameter.

6. The emulation apparatus according to claim 5, wherein said adjusting means selects the device from which the change parameter is read according to the following order of priority: (i) the rewritable recording medium, (ii) the non-rewritable recording medium, and (iii) the internal recording medium.

7. The emulation apparatus according to claim 1, wherein the particular processing parameter is a speed for processing an operation implemented by the software program, and said adjusting means adjusts the processing speed of the first information processing apparatus to a value more compatible with the software program.

8. An emulation apparatus, operable within a first information processing apparatus, for enabling the first information processing apparatus to better execute a software program that was originally intended for execution by a second information processing apparatus, the first information processing apparatus having a processing capability that is different than a processing capability of the second information processing apparatus, said emulation apparatus comprising:

determining means for determining, when the software program is being executed by the first information processing apparatus, whether the software program has requested a change of the processing capability of the first information processing apparatus; and adjusting means for, when said determining means determines that the software program has requested the change of the processing capability, changing a particular functional configuration of at least part of the first information processing apparatus to a predetermined functional configuration more compatible with execution of the software program and for changing a value of a particular processing parameter in the at least part of the first information processing apparatus to a value more compatible with execution of the software program based on a stored change parameter associated with the software program, the change in the functional configuration and in the value of the processing parameter thereby adjusting the processing capability of the at least part of the first information processing apparatus to emulate the processing capability of the second information processing apparatus.

9. The emulation apparatus according to claim 8, wherein said adjusting means reads the change parameter recorded in a device selected from the group consisting of: an internal recording medium, a non-rewritable recording medium loaded into the information processing apparatus, and a rewritable recording medium loaded into the information processing apparatus, and said adjusting means changes the processing capability based on the read change parameter.

10. The emulation apparatus according to claim 9, wherein said adjusting means selects the device from which the change parameter is read according to the following order of priority: (i) the rewritable recording medium, (ii) the non-rewritable recording medium, and (iii) the internal recording medium.

11. The emulation apparatus according to claim 8, wherein, when said determining means determines that the software program has requested the change of the processing capability, said adjusting means adjusts the functional configuration of said first information processing apparatus from its normal operating mode to an emulation mode more compatible with execution of the software program.

12. An emulation part, operable within a first information processing apparatus, for enabling the first information processing apparatus to better execute a software program that was originally intended for execution by a second information processing apparatus, the first information processing apparatus having a processing capability that is different than a processing capability of the second information processing apparatus, said emulation part comprising:

means for reading, when the software program is being executed by the first information processing apparatus and has requested a change of the processing capability of the first information processing apparatus, contents of the request;

means for reading a stored change parameter from a device selected from the group consisting of: an internal recording medium, a non-rewritable recording medium, and a rewritable recording medium, the stored change parameter being associated with the software program; and means for changing a value of a particular processing parameter in the first information processing apparatus to a value more compatible with execution of the software program based on the read change parameter, the change in the value of the processing parameter thereby adjusting the processing capability of the first information processing apparatus to emulate the processing capability of the second information processing apparatus.

13. A method of enabling a first information processing apparatus to better execute a software program that was originally intended for execution by a second information processing apparatus, the first information processing apparatus having a processing capability that is different than a processing capability of the second information processing apparatus, said method comprising:

determining, when the software program is being executed by the first information processing apparatus, whether the software program has requested a change of the processing capability of the first information processing apparatus; and when it is determined that the software program has requested the change of the processing capability, changing a value of a particular processing parameter in the first information processing apparatus to a value more compatible with execution of the software program based on a stored change parameter associated with the software program, the change in the value of the processing parameter thereby adjusting the processing capability of the first information processing apparatus to emulate the processing capability of the second information processing apparatus.

14. A medium readable by a first information processing apparatus and having recorded thereon a software program having instructions for carrying out a method of enabling the first information processing apparatus to better execute a further software program that was originally intended for execution by a second information processing apparatus, the first information processing apparatus having a processing capability that is different than a processing capability of the second information processing apparatus, said method comprising:

determining, when the further software program is being executed by the first information processing apparatus, whether the further software program has requested a change of the processing capability of the first information processing apparatus; and when it is determined that the further software program has requested the change of the processing capability, changing a value of a particular processing parameter in the first information processing apparatus to a value more compatible with execution of the further software program based on a stored change parameter associated with the further software program, the change in the value of the processing parameter thereby adjusting the processing capability of the first information processing apparatus to emulate the processing capability of the second information processing apparatus.

15. A medium readable by an information processing apparatus, the information processing apparatus including a host machine and an emulation part, the emulation part being operable to enable the information processing apparatus to better execute a software program originally intended for execution by a subordinate machine, the information processing apparatus having a processing capability that is different than a processing capability of the subordinate machine, the software program being recorded on and being readable from the recording medium, said recording medium comprising:

a first area which is readable by the information processing apparatus before execution of the software program and in which is recorded a type code indicating whether the software program is intended to be run on the host machine or on the subordinate machine; and a second area which is readable by the information processing apparatus during execution of the software program when the type code indicates that the software program was originally intended to be run on the subordinate machine and in which is recorded a change parameter, the change parameter defining a change in the value of a particular processing parameter in the host machine to a value more compatible with execution of the software program, the change in the value of the processing parameter thereby adjusting the processing capability of the host machine to emulate the processing capability of the subordinate machine.

16. In a first information processing apparatus, a processor that executes a software program for carrying out a method of enabling the first information processing apparatus to better execute a further software program that was originally intended for execution by a second information processing apparatus, the first information processing apparatus having a processing capability that is different than a processing capability of the second information processing apparatus, said method comprising:

determining, when the further software program is being executed by the first information processing apparatus, whether the further software program has requested a change of the processing capability of the first information processing apparatus; and when it is determined that the further software program has requested the change of the processing capability, changing a value of a particular processing parameter in the first information processing apparatus to a value more compatible with execution of the software program based on a stored change parameter associated with the further software program, the change in the value of the processing parameter thereby adjusting the processing capability of the first information processing apparatus to emulate the processing capability of the second information processing apparatus.

* * * * *

UNITED STATES PATENT AND TRADEMARK OFFICE
CERTIFICATE OF CORRECTION

PATENT NO. : 7,222,063 B2 Page 1 of 1
APPLICATION NO. : 09/929845
DATED : May 22, 2007
INVENTOR(S) : Teiji Yutaka It is certified that error appears in the above-identified patent and that said Letters Patent is hereby corrected as shown below:

Column 3, line 26, after "processing", insert "apparatus".

Signed and Sealed this

Tenth Day of June, 2008

JON W. DUDAS
*Director of the United States Patent and Trademark Office*